US012809033B2

(12) United States Patent
Grudinin

(10) Patent No.: US 12,809,033 B2
(45) Date of Patent: Nov. 24, 2026

(54) SYSTEMS AND METHODS FOR FLIGHT NAVIGATION USING LIDAR DEVICES

(71) Applicant: Beamlet, Inc., South Pasadena, CA (US)

(72) Inventor: Ivan S. Grudinin, South Pasadena, CA (US)

( * ) Notice: Subject to any disclaimer, the term of this patent is extended or adjusted under 35 U.S.C. 154(b) by 1124 days.

(21) Appl. No.: 17/832,235

(22) Filed: Jun. 3, 2022

(65) Prior Publication Data

US 2023/0393281 A1 Dec. 7, 2023

(51) Int. Cl.

*G01S 17/933* (2020.01)
*G01S 7/481* (2006.01)
*G01S 17/58* (2006.01)
*G01S 17/86* (2020.01)
*G01S 19/13* (2010.01)

(52) U.S. Cl.

CPC .......... *G01S 17/933* (2013.01); *G01S 7/4814* (2013.01); *G01S 17/58* (2013.01); *G01S 17/86* (2020.01); *G01S 19/13* (2013.01)

(58) Field of Classification Search

CPC ...... G01S 17/933; G01S 7/4814; G01S 17/58; G01S 17/86; G01S 19/13; G01S 7/4911; G01S 17/34

See application file for complete search history.

(56) References Cited

U.S. PATENT DOCUMENTS 8,175,126 B2 5/2012 Rakuljic et al.
8,897,654 B1 11/2014 Pierrottet et al.
9,007,569 B2 4/2015 AmZajerdian et al.
9,153,928 B2 10/2015 Fermann et al.
9,712,250 B2 7/2017 Pierrottet et al.
9,864,060 B2 1/2018 Sebastian et al.
10,620,302 B2 * 4/2020 Zhu ........................ G01S 7/4817
11,681,021 B2 * 6/2023 Asghari .................. G01S 17/34 356/5.01
11,821,994 B2 * 11/2023 Mansour ................. G01S 19/31
2006/0251420 A1 11/2006 Li et al.
2012/0251122 A1 10/2012 Grobe et al.
2014/0036252 A1 * 2/2014 Amzajerdian ........ G01S 17/875 356/28
2015/0097724 A1 * 4/2015 Veitsel .................... G01S 19/52 342/357.51
2016/0290785 A1 10/2016 Baier et al.
2017/0168146 A1 * 6/2017 Boehmke .............. G01S 7/4814
2017/0307736 A1 * 10/2017 Donovan ................ G01S 17/10

(Continued)

*Primary Examiner* — Yuqing Xiao
*Assistant Examiner* — Jempson Noel
(74) *Attorney, Agent, or Firm* — UCLA Patent Law Clinic

(57) ABSTRACT

Systems and methods for navigation using lidar devices in accordance with embodiments of the invention are disclosed. In one embodiment, a Reconfigurable Navigation Doppler Lidar (RNDL) for measuring velocity and position relative to terrain is disclosed, containing (1) an optical module with at least one laser source configured to generate a laser emission, where the at least one laser source is capable of operating in a plurality of modes, and a transceiver configured to generate at least one electronic return signal, and (2) a signal processing and control module configured to receive the at least one electronic return signal, generate a control signal, and transmit the control signal to the at least one laser source, where the control signal causes the at least one laser source to switch between the plurality of modes.

19 Claims, 12 Drawing Sheets

(56) References Cited

U.S. PATENT DOCUMENTS

| | | | | |
|---|---|---|---|---|
| 2019/0346568 | A1 | 11/2019 | Feng et al. | |
| 2020/0025887 | A1* | 1/2020 | Dussan | G01S 17/10 |
| 2020/0284883 | A1 | 9/2020 | Ferreira et al. | |
| 2020/0341117 | A1 | 10/2020 | Sandford et al. | |
| 2020/0349213 | A1 | 11/2020 | Oztaskent et al. | |
| 2020/0386888 | A1* | 12/2020 | Moore | G01S 7/4815 |
| 2021/0072384 | A1* | 3/2021 | Margallo Balbás | G01S 7/4863 |
| 2021/0286063 | A1 | 9/2021 | Amarloo et al. | |
| 2021/0373157 | A1* | 12/2021 | Pierrottet | G01S 17/34 |
| 2022/0050201 | A1* | 2/2022 | Sun | G01S 17/34 |

* cited by examiner

SYSTEMS AND METHODS FOR FLIGHT NAVIGATION USING LIDAR DEVICES

FEDERALLY SPONSORED RESEARCH

This invention was made with Government support under contract 80NSSC21C0131 awarded by NASA. The Government has certain rights in the invention.

FIELD OF THE INVENTION

The present invention generally relates to navigation and more specifically to systems and methods for navigation using lidar devices.

BACKGROUND

A Doppler effect (may also be referred to as "Doppler shift" or "Doppler") may be described as a change in frequency of a wave in relation to an observer who is moving relative to the wave source. For example, the Doppler effect is observed when the source of the waves is moving towards or away from the observer. If the source is moving towards the observer, the perceived frequency is higher than the emitted frequency. If the source is moving away from the observer, the perceived frequency is lower than the emitted frequency.

SUMMARY OF THE INVENTION

The various embodiments of the present systems and methods for navigation using lidar devices (may collective be referred to as "Reconfigurable Navigation Doppler Lidars" (RNDLs)) contain several features, no single one of which is solely responsible for their desirable attributes. Without limiting the scope of the present embodiments, their more prominent features will now be discussed below. In particular, the present RNDLs will be discussed in the context of measuring velocity and/or position relative to terrain. However, the use of velocity and position is merely exemplary and various other measurements may be utilized for navigation using lidar devices as appropriate to the requirements of a specific application in accordance with various embodiments of the invention. After considering this discussion, and particularly after reading the section entitled "Detailed Description," one will understand how the features of the present embodiments provide the advantages described here.

In many embodiments, RNDLs may include components (may also be referred to as "modules" or "elements") such as, but not limited to, a signal processing and control module (SPCM) and optical transceivers. In several embodiments, a RNDL may measure radial velocity and distance of points in a terrain relative to itself. For example, radial velocity may be a projection of velocity vector onto a line of sight, which may be defined as a line connecting the sensor to the point that is being measured. This point may also be called a target. In some embodiments, the point may have some spatial extent rather than being a point in a purely mathematical sense. In various embodiments, the terrain or environment may include static objects and/or surfaces external to the sensor system. Examples may include the ground, buildings, and/or static or slowly moving objects. The various measurements may also be made for moving objects that are not part of the terrain. As further described below, the target may be a small surface area that belongs to some object.

In some embodiments, the components may include an optical waveform generator, collimating and beam steering optics, a digital signal processing (DSP) module, an inertial measurement unit (IMU), a global navigation satellite system (GNSS) receiver, a digital camera, and other submodules. The various components may be implemented in many ways known to one skilled in the art. For example, the transceiver may be implemented on an integrated optics platform represented by a chip with waveguides and other elements. The parts responsible for optical waveform generation may be located on both the chip and on the printed circuit board (PCB) or a separate chip (e.g., a chip that includes the SPCM electronics).

In various embodiments, the transceiver may aim laser emission in one or more directions, receive light reflected along those directions, mix received light with a local oscillator light, and produce electric return signals related to mixing optical fields. In certain embodiments, a RNDL may have one or more optical transceivers that perform this function. In some embodiments, each transceiver may have a dedicated laser generating a laser emission. In various embodiments, there may be one laser providing laser emission to multiple transceivers. In several embodiments, a RNDL may include an integrated optics chip. The integrated optics chip may include a laser that may be integrated on the chip or may be separate from the chip, an optical isolator, and optical elements that collimate light emitted by the chip or by the laser. In many embodiments, an isolator may be used to prevent laser emission reflections from returning to the laser. In several embodiments, the collimating optics may include no lens, a single lens, or a combination of lenses. In some embodiments, the emitting and receiving apertures may be located on the chip. For example, an on-chip aperture may include, but is not limited to, optical phased arrays, grating coupler structures, combinations of waveguides, scattering or emitting structures, and phase delay structures; these components may work together to provide collimated emission from the surface of the integrated optics chip. In many embodiments, light may travel in waveguides and components of the integrated optics chip and may be emitted into the environment as a free space beam. In some embodiments, lidar emissions may be directed at an angle from the chip surface. In many embodiments, the lidar emissions may reflect from a target in the environment and return to the optical aperture to be coupled back into the optical chip waveguide.

In many embodiments, the control module of the SPCM may provide signals to establish optical emission from the laser and to control its frequency, power, and temperature. For example, a RNDL may include a control module configured to provide a stable bias current to the laser such that laser frequency does not change in time. In some embodiments, the control module may be configured so that laser emission frequency is a repeating pattern with linearly increasing and decreasing optical frequency. In certain embodiments, the bandwidth of optical frequency excursions during this pattern and the repetition rate of the pattern may be adjusted to optimize sensor performance for a variety of measurement conditions. In some embodiments, the control module may also reconfigure optical transceivers or a DSP to process electrical signals generated by transceivers using a plurality of data processing modes or regimes.

In many embodiments, RDNLs may operate in a regime where the laser may emit light with a single stable optical frequency. In several embodiments, a DSP may perform a recording of digital samples of electric return signals through an analog-to-digital converter (ADC) and store it in memory. In some embodiments, a DSP may perform time to frequency conversions including, but not limited to, fast Fourier transforms on measurement data to reveal Doppler shifts in optical frequencies. For example, a Doppler shift of the frequency of an optical return signal may detected or measured if a target has a non-zero radial velocity. In some embodiments, velocity of the sensor system relative to a target surface may be measured in some, or all, of the channels. In many embodiments, the channels may point in different directions. In several embodiments, the length of a digital record that is transformed may be changed to adjust measurement rates or to adjust the resulting signal-to-noise ratio (SNR) of measurements. For example, in certain embodiments, at high altitudes when an optical signal reflecting off a target may be weaker the length of a recording segment may be longer to provide better SNR, and there may also be more segments processed and their spectra averaged. In some embodiments, when at lower altitudes or when maneuvering is required, the recording may be shorter to provide a faster measurement rate. In many embodiments, the velocity regime may provide better SNR compared to other operating regimes and may be used for positioning or localization.

In many embodiments, RNDLs may operate in a regime where a laser may emit light with a repeating pattern of frequency modulation. In certain embodiments, this frequency modulated continuous wave (FMCW) emission may lead to generation of the electrical return signal in a transceiver. This signal may be used to calculate the relative velocity and/or relative range to a target. In some embodiments, this may be used for mapping and surveying, for landing of autonomous aerial vehicles, for imaging the ground, or for detection of obstacles (e.g., wires, branches, poles, etc.). In many embodiments, the rate of the repeating pattern and the optical bandwidth may be adjusted to optimize for better range resolution or for higher data rate. In some embodiments, a digitized electrical return signal may be processed in different ways which are known to one skilled in the art. In some embodiments, the SNR in FMCW mode may be lower than in a velocity regime.

In several embodiments, RNDLs may measure state variables with respect to the environment and to characterize the environment through Doppler imaging. In certain embodiments, Doppler imaging includes, but is not limited to, imaging in which each point in the image may contain range and/or radial velocity information. In many embodiments, the RNDL may measure state variables including, but not limited to, vector velocity, range to a reference point or to several reference points, elevation over the ground, and angle of the sensor with respect to reference points including targets, terrain, and initial position. In certain embodiments, a RNDL may be rigidly attached to a movable platform, including, but not limited to, ground or aerial vehicles. In some embodiments, a RNDL may provide measured state variables to a host vehicle. In some embodiments, state variables may assist in performing vehicle navigation in the event of a GNSS outages or degradations. In many embodiments, the precision and update rate of measurements provided by a RNDL may greatly exceed what is possible with GNSS. For example, in many embodiments, a RNDL may measure velocity to mm/s levels of accuracy or precision and range to mm levels of accuracy or precision with respect to a target at rates of thousands of measurements per second. In many embodiments, the environment may be characterized to detect obstacles and to increase safety of vehicles equipped with a RNDL. In some embodiments, a RNDL may assess the flatness of a potential landing location. In certain embodiments, a RNDL may fuse range and velocity measurements with outputs from an onboard inertial measurement unit (IMU) through a filter algorithm, and any resulting positioning data may be much higher quality compared to using an IMU without a RNDL. In many embodiments, higher quality data may be used for navigation without a GNSS. In some embodiments, a RNDL may enable a dead reckoning approach to be effective, which provides many benefits to practical applications.

In a first aspect, a RNDL for measuring velocity and position relative to terrain is provided, the RNDL comprising an optical module including: at least one laser source configured to generate a laser emission, where the at least one laser source is capable of operating in a plurality of operating modes, and a transceiver configured to generate at least one electrical return signal, and a signal processing and control module configured to receive the at least one electrical return signal, generate a control signal, and transmit the control signal to the at least one laser source, where the control signal causes the at least one laser source to switch between the plurality of operating modes.

In an embodiment of the first aspect, the plurality of operating modes includes a velocity mode, where the velocity mode uses a stable laser emission frequency.

In another embodiment, the plurality of operating modes includes a range-plus-velocity mode, where the range-plus-velocity mode uses a Frequency-Modulated Continuous Wave (FMCW) laser emission.

In another embodiment, the plurality of operating modes includes an imaging mode, where the imaging mode uses a FMCW laser emission and where range and velocity data are produced at an increased rate compared to the range-plus-velocity mode.

In another embodiment, the RNDL further includes a plurality of transceivers.

In another embodiment, each of the plurality of transceivers operates independently.

In another embodiment, the transceiver is further configured to convert a portion of the laser emission into at least one sensing optical signal and a local oscillator optical signal, receive an optical return signal, where the optical return signal includes a portion of the at least one sensing optical signal that was scattered by a target, and generate the at least one electrical return signal by mixing the optical return signal and the local oscillator optical signal using a detector.

In another embodiment, the signal processing and control module is further configured to process the at least one electrical return signal to calculate a radial velocity.

In another embodiment, the signal processing and control module is further configured to process the at least one electrical return signal to calculate a range.

In another embodiment, the signal processing and control module is further configured to process the radial velocity from at least two transceivers to calculate a vector velocity.

In another embodiment, optical power emitted by the at least one laser source can be arbitrarily distributed among the at least two transceivers.

In another embodiment, each of the plurality of transceivers further comprises a dedicated laser source with a selectable operating mode.

In another embodiment, the RNDL further includes at least one optical element to collimate the at least one sensing optical signal.

In another embodiment, the at least one optical element changes a direction associated with the at least one sensing optical signal.

In another embodiment, the at least one electrical return signal generated by the transceiver includes in-phase (I) and quadrature (Q) signals.

In another embodiment, the processing and control module is further configured to determine a Doppler velocity sign.

In another embodiment, the RNDL further includes an inertial measurement unit (IMU) configured to detect the RNDL's acceleration.

In another embodiment, the IMU is further configured to detect the RNDL's rotation.

In another embodiment, the RNDL further includes a digital camera configured to record image data.

In another embodiment, the RNDL further includes a global navigation satellite system (GNSS) receiver.

BRIEF DESCRIPTION OF THE DRAWINGS

The various embodiments of the present systems and methods for navigation using lidar devices will be discussed in detail with an emphasis on highlighting the advantageous features. In particular, the present embodiments include Reconfigurable Navigation Doppler Lidars (RNDLs) and these embodiments depict the novel and non-obvious RNDLs shown in the accompanying drawings, which are for illustrative purposes only. These drawings include the following figures.

DETAILED DESCRIPTION OF THE DRAWINGS

Figure 1A:
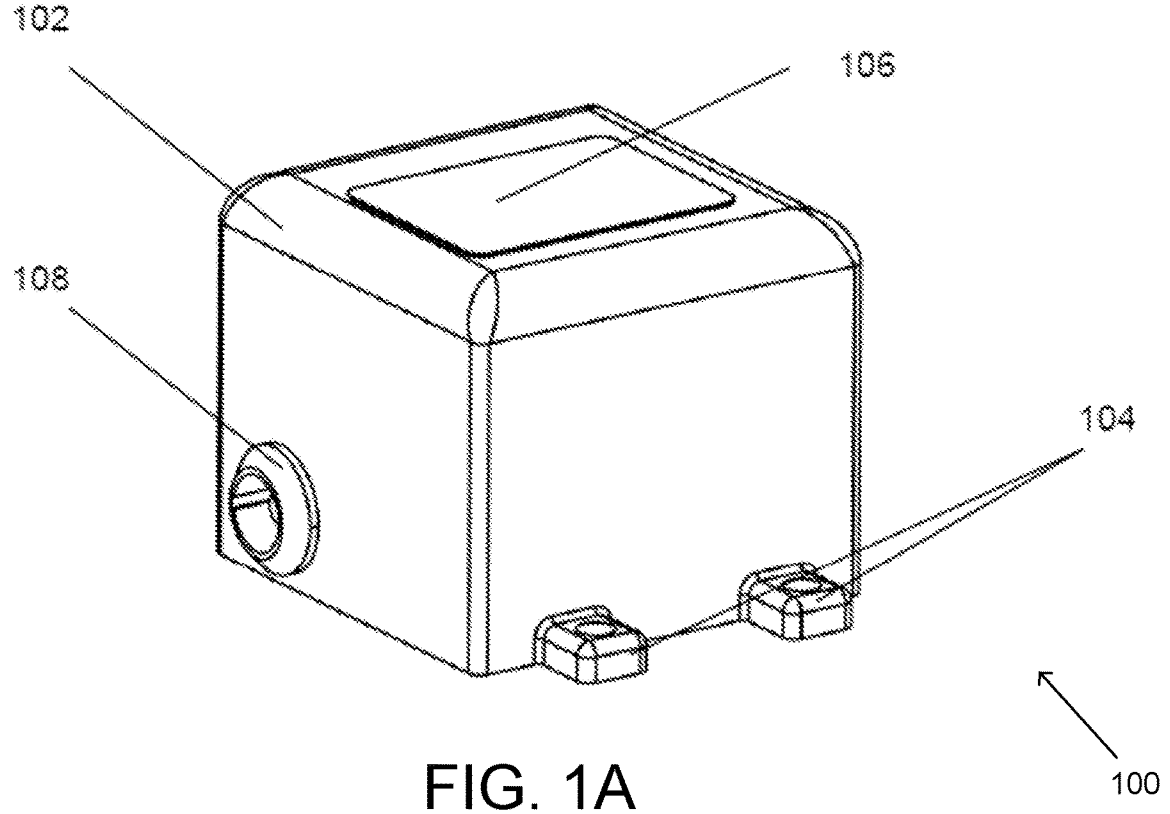
FIG. 1A is a schematic diagram illustrating an RNDL in accordance with an embodiment of the invention.

The following detailed description describes the present embodiments with reference to the drawings. In the drawings, reference numbers label elements of the present embodiments. These reference numbers are reproduced below in connection with the discussion of the corresponding drawing features.

Turning now to the drawings, systems and methods for navigation using lidar devices (may collectively be referred to as "Reconfigurable Navigation Doppler Lidars" (RNDLs)) in accordance with embodiments of the invention are now disclosed. In many embodiments, RNDLs may include at least one laser source, at least one transceiver, and a signal processing and control module (SPCM) configured to adjust the at least one laser source between a plurality of modes, as further described below. In various embodiments, the plurality of modes may include a velocity-only mode that may utilize a constant laser emission frequency, a range-plus-velocity mode that may utilize an FMCW laser emission, and an imaging mode that may utilize an FMCW laser emission such that an increased measurement or data rate compared to range-plus-velocity mode is established. In many embodiments, the lidar device may cause the laser source to emit optical beams. Each of these beams, upon contacting an object, may create scattered light. Some of that light may then return to the RNDL's photodetectors in the channel that emitted the light beam. Mixing of this optical return with a portion of the laser light (the so-called local oscillator light) by photodetectors may be used to generate an electrical return signal that is digitized and processed in the RNDL's signal processing and control module (SPCM). The SPCM may provide various control functions such as, but not limited to, controlling the laser to create a desired optical frequency modulation or no modulation. In some embodiments, the SPCM may cause the reconfiguration of the optical transceiver, the allocation of laser power between transceivers and/or the beam steering of the optical signals.

In some embodiments, a RNDL may provide navigation data by utilizing Doppler shifts. A Doppler shift may be considered as the change in frequency a wave undergoes when it reflects off a moving surface. This frequency shift may be proportional to the velocity of the reflector along a line of sight, which may also be referred to as radial velocity. In many embodiments, a RNDL may use measurements taken in multiple non-coplanar directions to derive the vector velocity of the observer (e.g., a vessel utilizing a RNDL) with respect to multiple static points in the terrain that reflected the beams. In certain embodiments, two measurements may be used to derive a vector velocity in a plane if the third direction is constrained. A RNDL may be useful for tasks including, but not limited to, collision avoidance, skid detection in wheeled vehicles, navigating without GPS/GNSS, and correcting data from inertial measurement units (IMU). In some embodiments, a RNDL may assist with collision avoidance by detecting potential hazards within a given flight path. By enhancing collision avoidance and enabling high performance dead reckoning, a RNDL may facilitate tasks requiring safe autonomous navigation (e.g., delivery of goods, aerial mapping, etc.). In many embodiments, a RNDL may use vector velocity measurements to correct position derived from IMU readings to improve navigation accuracy.

In certain embodiments, a RNDL may be used to calculate real-time range and velocity relative to objects. In some embodiments, optical components of an optical module may be aligned to guide, collimate or shape laser emission and to receive reflected laser emissions. A reflected laser emission may be converted into an electrical signal which may be used to calculate navigational variables. In some embodiments, the electrical signal may be received by a SPCM or other module and those modules may perform the calculation of navigational data. In many embodiments, a control module may receive inputs including, but not limited to, flight data, navigation data or external commands, and may use the inputs to assist in controlling a laser source. RNDLs in accordance with embodiments of the invention are discussed further below.

RNDL Devices

RNDLs may be used to perform various functions such as, but not limited to calculating relative ranges and velocities of nearby locations (e.g., targets) in the surrounding environments (e.g., terrains). A schematic diagram illustrating an RNDL in accordance with an embodiment of the invention is shown in FIG. 1A. A RNDL 100 may include a frame 102 that may be made with metal (or other rigid material) and be configured to hold internal elements. The frame 102 may be of a standard shape (e.g., square or rectangular box) or be of a more irregular shape designed for improved integration of the RNDL 100 with a vehicle. The RNDL 100 may include one or more windows 106 that may be configured to transmit light and protect internal components. In some embodiments, the windows 106 may be made with plastic, glass, or similar material, may be flat or curved, and may have a rectangular or other shape. In some embodiments, the windows 106 may have a coating with desired optical properties including, but not limited to, filtering of particular wavelengths, transmission of particular wavelengths, anti-glare, anti-reflection, and similar relevant optical properties. For example, in several embodiments, the windows 106 may have a coating that allows transmission of optical spectrum near 900 nm, 1300 nm, 1550 nm or 2000 nm wavelength, and filters out ranges of wavelengths outside of one or several of such wavelengths and/or spectrums. In many embodiments, the transmission spectrum may include the spectrum of frequencies the RNDL 100 may emit, as well as the spectrum of frequencies that these emissions may return at (e.g., accounting for Doppler shift). In some embodiments, a coating may provide anti-reflection qualities that reduce reflection for wavelengths of light for one in the above list of example wavelengths. The RNDL 100 may include mounts 104 that may be used to attach the RNDL 100 to another object or surface, such as, but not limited to, a vehicle. The RNDL 100 may include connectors 108 that may include mounting fasteners to connect an external cable such that power may be provided to the RNDL 100 and data and control commands could be communicated to and from the RNDL 100. In some embodiments, the power supply and data communications may be wireless.

Figure 1B:
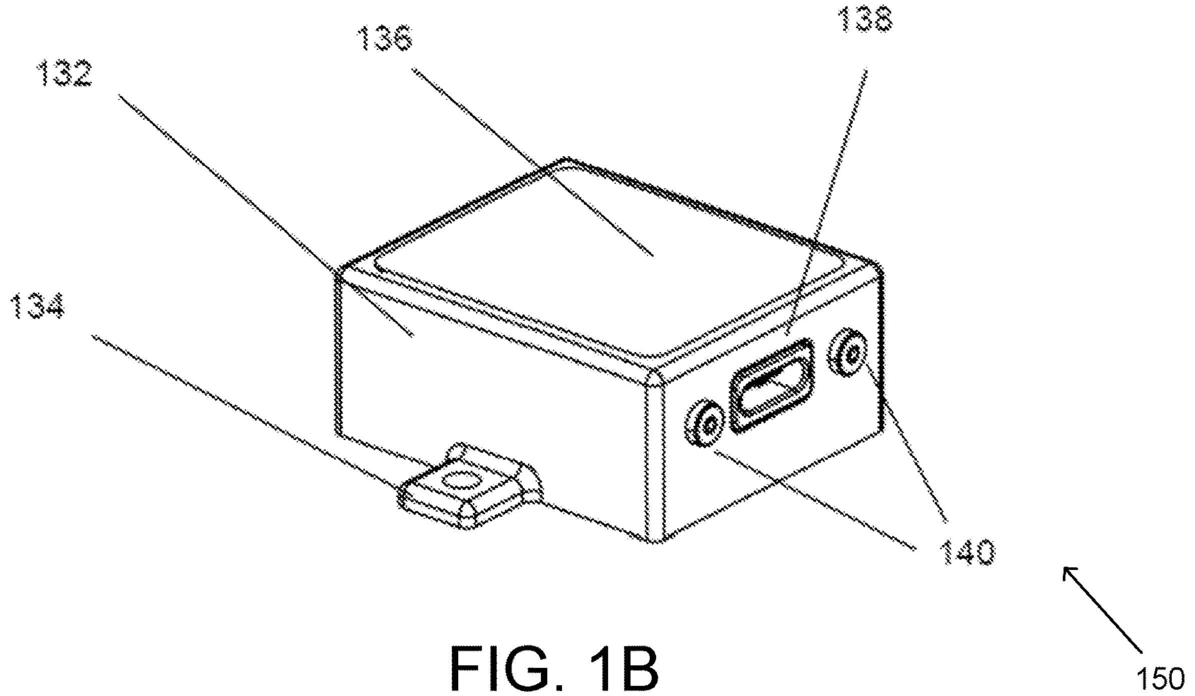
FIG. 1B is a schematic diagram illustrating an RNDL in accordance with another embodiment of the invention.

A schematic diagram illustrating an RNDL in accordance with another embodiment of the invention is shown FIG. 1B. A RNDL 150 may include a frame 132 that may be made with metal (or other rigid material) and be configured to hold internal elements. The frame 132 may be of a simple shape or be of a more irregular shape designed for improved integration of the RNDL 150 with a vehicle. The RNDL 150 may include one or more windows 136 that may be configured to transmit light and protect internal components, as described above. In many embodiments, the transmission spectrum may include the spectrum of frequencies the RNDL 150 may emit, as well as the spectrum of frequencies that these emissions may return at (e.g., accounting for Doppler shift). In some embodiments, a coating may provide anti-reflection qualities that reduce reflection for wavelengths of light for one in the above list of example wavelengths. The RNDL 150 may include mounts 134 that may be used to attach the RNDL 150 to another object or surface, such as, but not limited to, a vehicle. The RNDL 150 may include connectors 138 that may include mounting fasteners 140 to connect an external cable such that power may be provided to the RNDL 150 and data and control commands could be communicated to and from the RNDL 150. In some embodiments, the power supply and data communications may be wireless.

Although specific RNDLs and components are discussed above with respect to FIGS. 1A-B, any of a variety of RNDLs and various components as appropriate to the requirements of a specific application may be utilized in accordance with embodiments of the invention. Signal collection and processing considerations in accordance with embodiments of the invention are discussed further below.

Signal Collection and Processing Considerations

Figure 2:
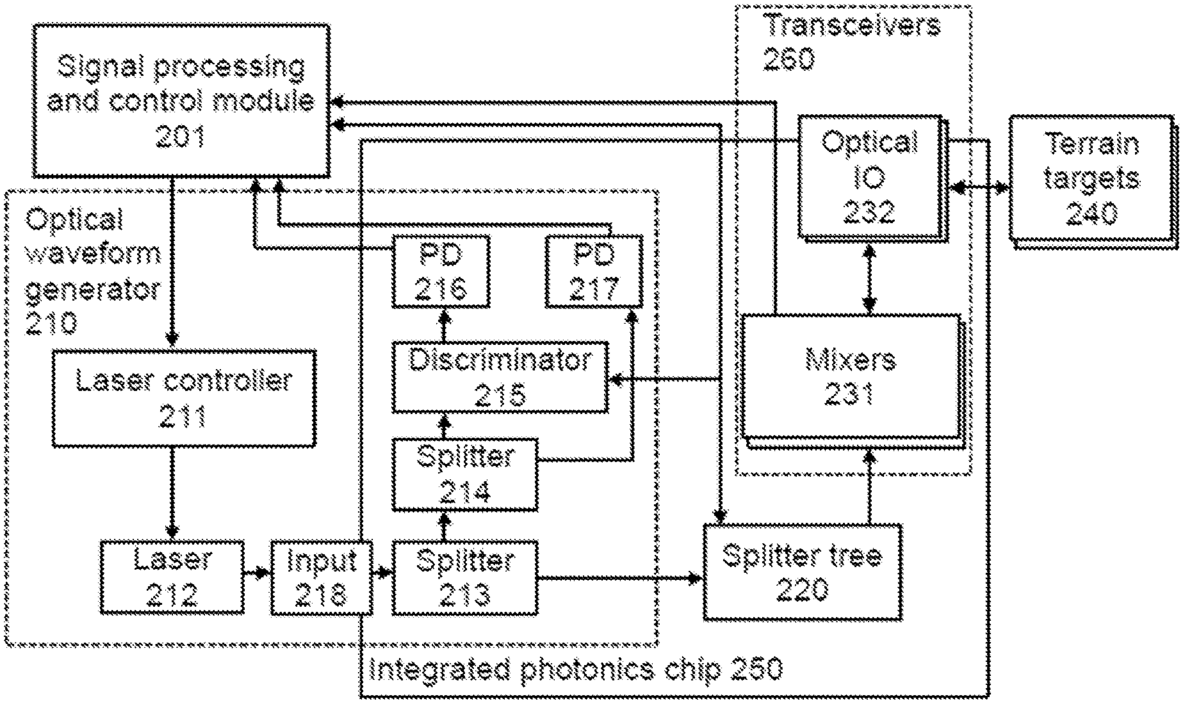
FIG. 2 is a schematic diagram of one optical waveform generator integrated with one signal processing and control module (SPCM) and one or more optical transceivers in accordance with an embodiment of the invention.

A schematic diagram of one optical waveform generator integrated with one signal processing and control module (SPCM) and one or more optical transceivers in accordance with an embodiment of the invention is shown in FIG. 2. In many embodiments, RNDLs may include a SPCM 201, an optical waveform generator 210, and one or more transceivers 260. The SPCM 201 may be configured to control other modules including, but not limited to, an optical waveform generator 210 and/or a transceiver 260. As illustrated in FIG. 2, the SPCM 201 may control the optical waveform generator (OWG) 210 to enable laser emission with desired frequency modulation. The SPCM 201 may also control a laser controller 211 which provides the laser 212 with temperature control and injection current. The SPCM 201 may also change discriminator 215 properties, and configuration of the splitter tree 220. The SPCM 201 may also receive the electrical return signals from mixers 231 and the monitoring electrical signals from the photodetectors 216, 217. In various embodiments, the splitters 213, 214 may split an optical signal into two optical outputs, and a splitter tree 220 may create multiple outputs from a single input. A splitter tree 220 may be created using components such as, but not limited to, cascaded binary splitters or cascaded controllable elements that may change splitting ratio.

In reference to FIG. 2, the laser 212 can include a temperature control element and an optical isolator and focusing lenses for coupling to splitter 213 through an input 218. The arrow between laser 212 and input 218 can be a free space beam path or an optical fiber. The arrows inside the chip 250 represent on-chip waveguides. The integrated photonics chip 250 can be implemented with many platforms including, but not limited to, silicon on insulator (SOI), III-V materials (e.g., InP), silicon nitride, photonic light circuits with doped waveguides in glass, and other platforms known to one skilled in the art. The discriminator 215 may provide conversion of laser frequency changes to optical power changes and can be represented by a Mach-Zehnder interferometer, an optical resonator, or similar components known to one skilled in the art. The mixers 231 accept a portion of laser power from the splitter tree 220 outputs, provide an optical sensing signal to an optical input and output (IO) 232 and an electrical return signal to a SPCM 201. The optical IO 232 provides for conversion of the light from on chip waveguides to free space and can include beam shaping and steering optics. The mixers 231 along with optical IO 232 can be categorized as transceivers 260 that transmit and receive light. The free space beams from the optical IO 232 travel to targets 240 and create scattered light, some portion of which travels back to optical IO 232 and then reaches the mixers 231.

Figure 3:
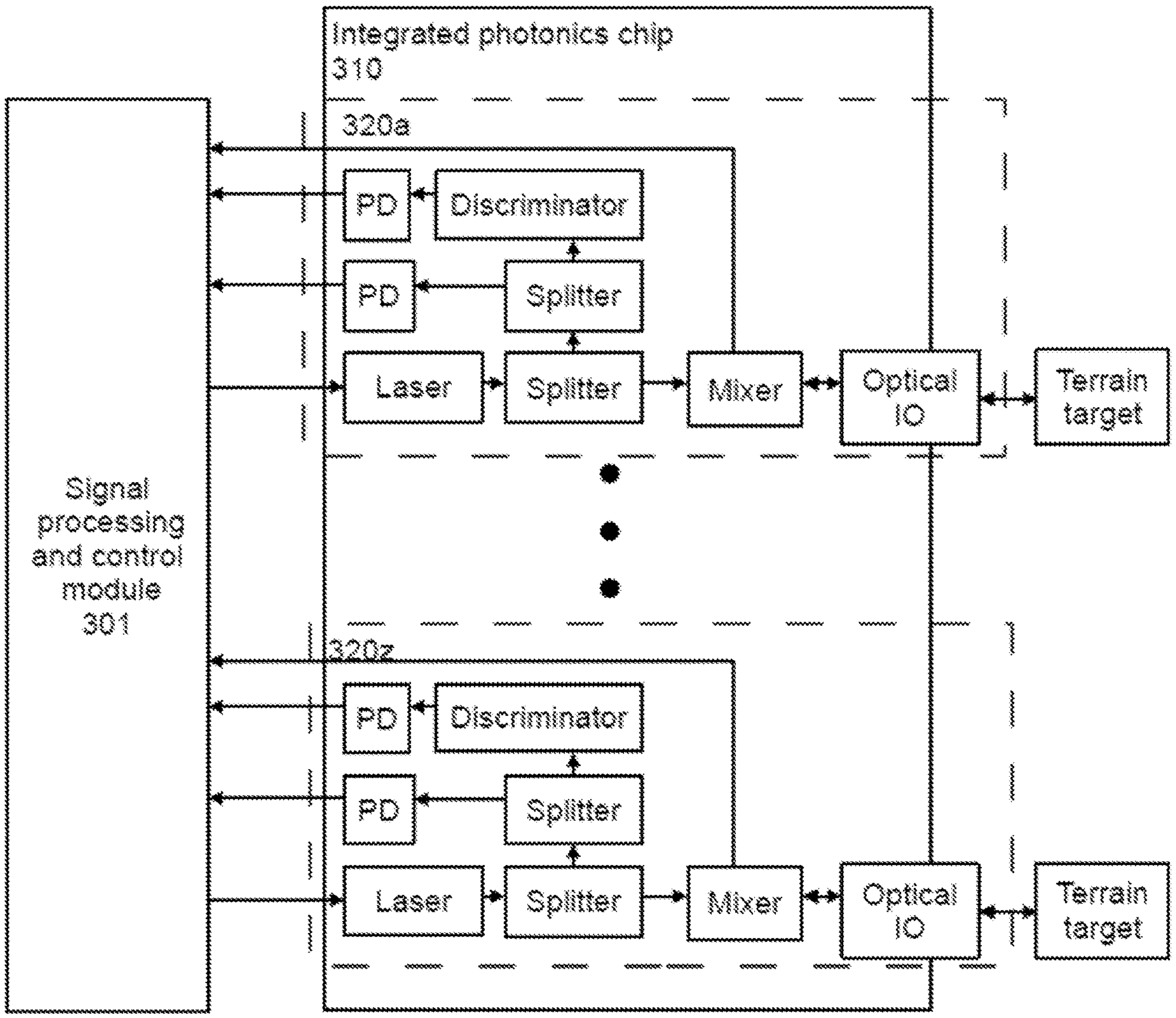
FIG. 3 is a schematic diagram of a SPCM integrated with multiple laser devices in accordance with an embodiment of the invention.

A schematic diagram of a SPCM integrated with multiple laser devices in accordance with an embodiment of the invention is shown in FIG. 3. As illustrated in FIG. 3, a single SPCM 301 may be integrated with multiple channels of transceivers 320*a* . . . 320*z*, each of which in this case includes a laser, splitters, discriminator, photodetectors, mixer, and optical IO. Each channel interrogates a distinct terrain target. The three vertically arranged dots between the two shown channels 320*a* and 320*z* represent additional channels that can be present. All channels may be implemented on the same integrated photonics chip 310. The interaction of these components is like that described for FIG. 2, with the main difference being that the lasers may be integrated on the chip 310 without the presence of a splitter tree. Since each transceiver 260 has its own laser, each channel 320 can operate in its own mode with a laser modulation format specific to that channel.

Figure 4A:
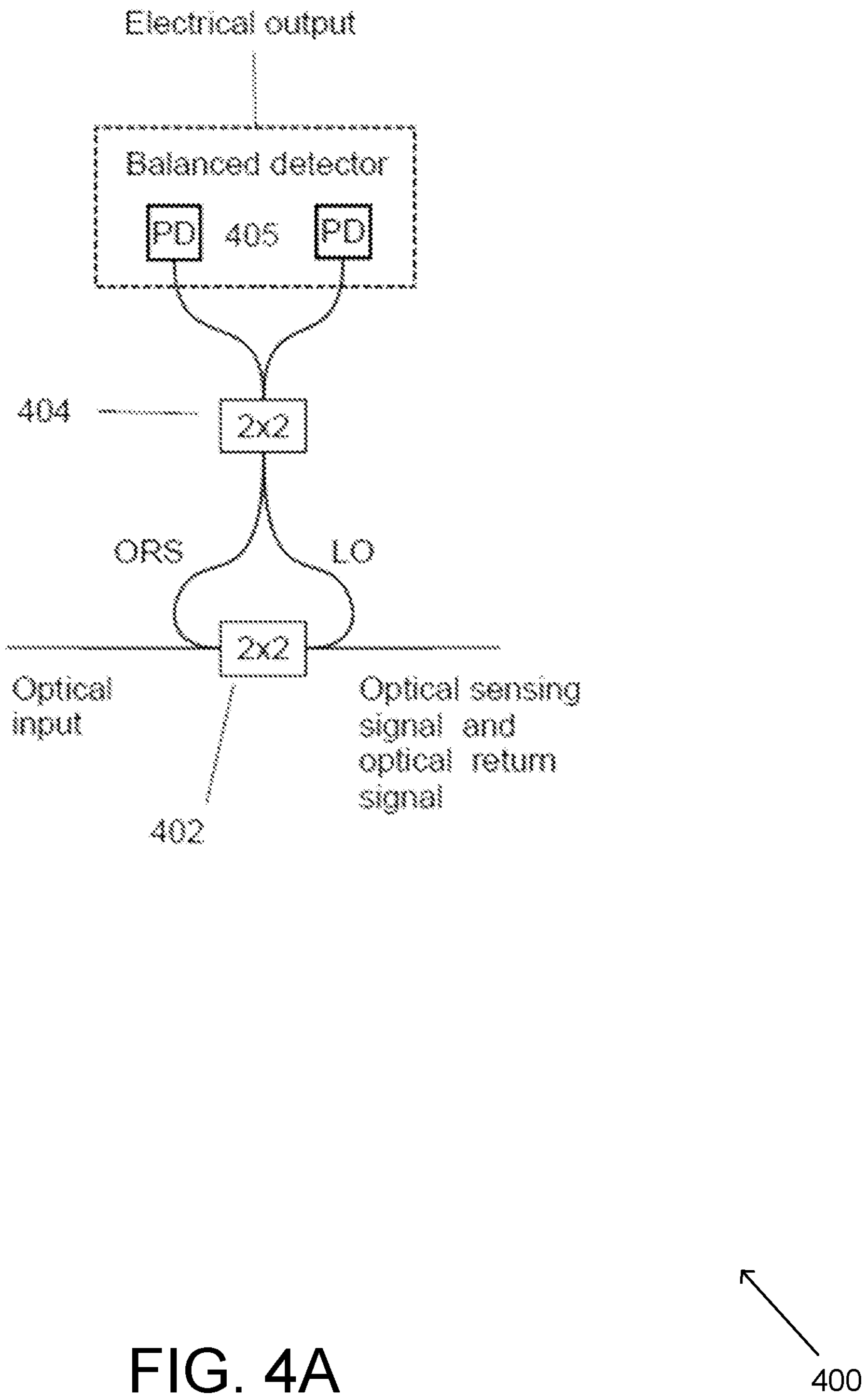
FIG. 4A is a schematic diagram illustrating an optical mixer (may also be referred to as "mixer") with a balanced detection in accordance with an embodiment of the invention.
Figure 4B:
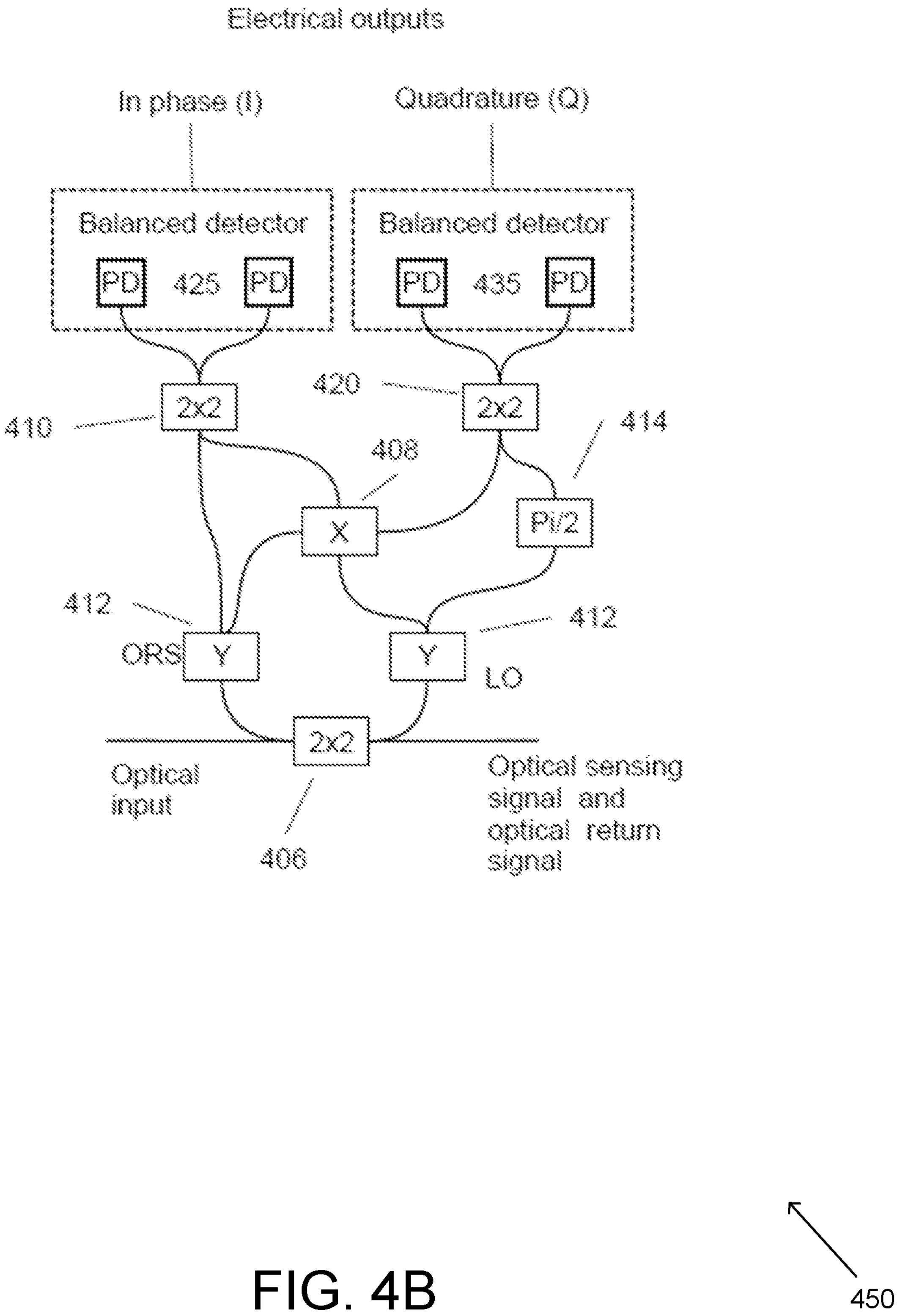
FIG. 4B is a schematic diagram illustrating an optical mixer with a balanced detection of I/Q components in accordance with an embodiment of the invention.

A schematic diagram illustrating an optical mixer (may also be referred to as "mixer") with a balanced detection in accordance with an embodiment of the invention is shown in FIG. 4A. A schematic diagram illustrating an optical mixer with a balanced detection of I/Q components in accordance with an embodiment of the invention is shown in FIG. 4B. FIGS. 4A-B show how a mixer 231 inside a transceiver 260 can create an electrical return signal 934. The implementation shown may relate to integrated photonics. In one configuration of a mixer 231 with balanced detection 400 the optical input may be split into an optical sensing signal and a local oscillator signal (LO) by a 2×2 splitter 402. The 2×2 splitter 402 can be represented by an integrated photonics directional coupler, multi-mode interference coupler, or by a fiber-optical spliced fiber coupler. It may have two inputs and two outputs with some power transmission coefficient between the input and output channels. For example, input in any channel may be split into two outputs in equal parts (e.g., 50/50) or in non-equal parts (e.g., 25/75, 10/90, etc.). The optical phase in one output may be shifted by PI/2 radians with respect to input optical phase while the other output may have no phase shift. The splitter 402 routes a portion of the optical return signal (ORS) to another 2×2 splitter 404 along with the LO signal. That second 2×2 splitter 404 creates two pairs of portions of LO and ORS signals that are routed to a balanced detector 405. The balanced detector 405 creates electrical signals from light it receives from the two outputs of the 2×2 splitter 404. This balanced detection arrangement helps to reduce unwanted signals caused by laser amplitude noise for example. This process of balanced detection, as well as 2×2 couplers, is known to one skilled in the art. In another implementation of the mixer 450, the in-phase (I) and quadrature (Q) electrical return signals are created by the balanced detectors 425, 435 such that there is nearly a Pi/4 radians phase difference between the I and Q signals. This can be achieved by creating two optical LO signals with optical Pi/2 phase difference 414 between the two and mixing them with two identical copies of the optical return signal ORS. The crossing element (X) 408 is typical of integrated photonics implementations; crossing-free implementations of I/Q mixers also exist. Crossing allows two beams to cross paths without interference. Here, the 2×2 splitter 406 creates an LO signal and the optical sensing signal. It also receives the optical return signal and splits a portion of it which is routed to a 1×2 splitter (a Y-junction) 412. This Y-junction or 1×2 splitter can be implemented using coupled waveguides or a multimode interference device in integrated photonics. This splitter may create two copies of the ORS. One may be routed to splitter 410 and the other may be routed to splitter 420 via the crossing 408. The LO signal may be split into two portions by splitter 412. One portion may be routed to the splitter 410 via the crossing 408 and another portion of the LO may be routed to splitter 420 such that there is an optical phase shift of nearly Pi/2 radians between the two portions of the LO signal as seen by the balanced detectors 425, 435. This or similar arrangements may implement what is also known as a 90-degree optical hybrid.

Figure 5:
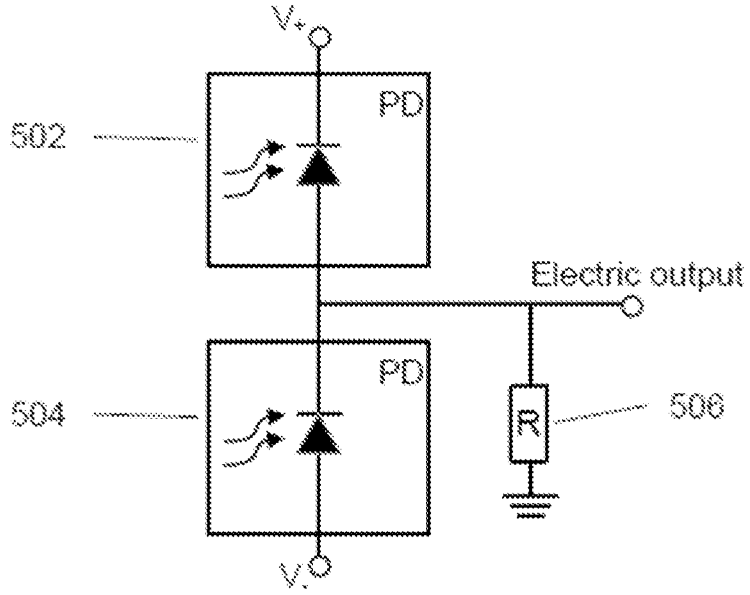
FIG. 5 is a schematic diagram illustrating a balanced detector in accordance with an embodiment of the invention.

A schematic diagram illustrating a balanced detector in accordance with an embodiment of the invention is shown in FIG. 5. FIG. 5 illustrates how two semiconductor PIN-type photodiodes 502, 504 may be connected to form a balanced detector. The bias voltage $V_+$ and $V_-$ may be applied in reverse, such that there may be only a tiny leakage current flowing through the photodiodes when no light is present. When light is present, the photocurrents from each of the two photodetectors may be subtracted and the resulting difference current may be converted to voltage on a load resistor 506 having resistance R. The subtraction of the photocurrents may cancel any amplitude noise that may be equally present in light received by each photodiode.

In many embodiments, the transceiver may be an optical module which may perform functions such as, but not limited to, emitting laser light in one or more directions, receiving light reflected in one or more directions, mixing received light with a local oscillator light, and producing an electric signal related to the mixing optical fields. An optical module can have one or more optical channels that perform these functions. Triangular FMCW waves are discussed further below.

Although specific signal collection and processing considerations are discussed above with respect to FIGS. 2-4B, any of a variety of signal collection and processing as appropriate to the requirements of a specific application may be utilized in accordance with embodiments of the invention. Triangular FMCW waves in accordance with embodiments of the invention are discussed further below.

Triangular FMCW Waves

Figure 6:
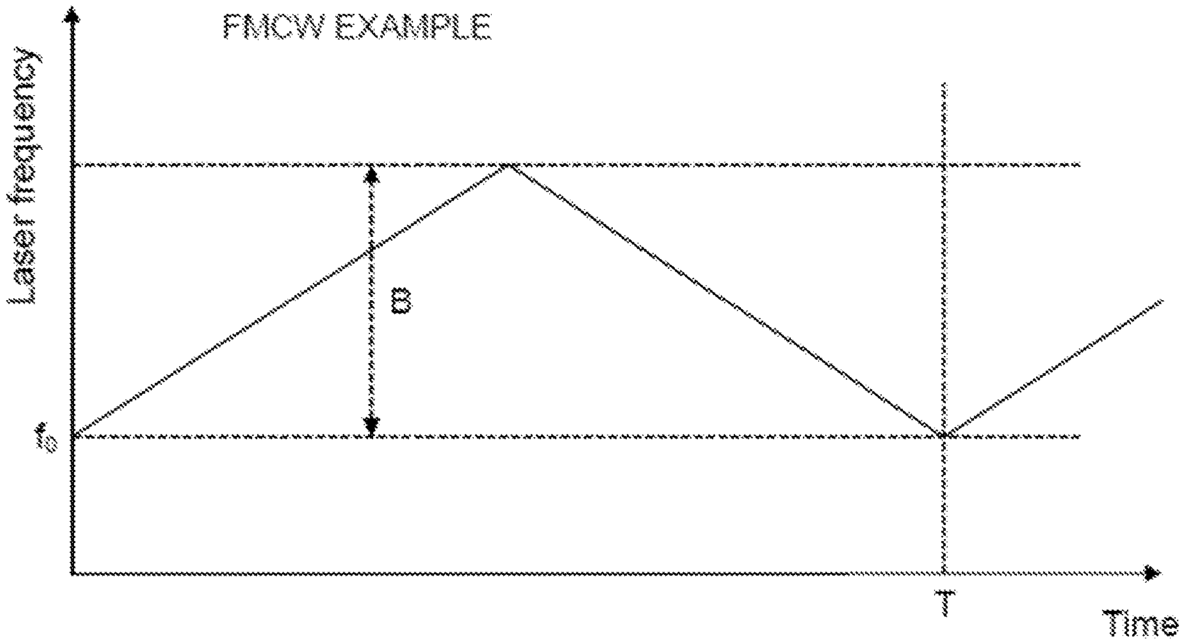
FIG. 6 is a graph depicting a laser beam frequency modulated with a linear triangular waveform in accordance with an embodiment of the invention.

A graph depicting a laser beam frequency modulated with a linear triangular waveform in accordance with an embodiment of the invention is depicted in FIG. 6. The laser frequency may increase linearly with time from an initial optical frequency $f_0$ to a frequency $f_0$+B; this may be referred to as an upchirp. Then, the optical frequency may linearly decrease with time until it reaches the initial frequency $f_0$; this may be referred to as a downchirp. The time to complete an upchirp and downchirp cycle may be referred to as the period (T). In many embodiments, the upchirp may occur for half the period (e.g., T/2 time) followed by a downchirp for half the period (e.g., T/2 time). The process is repeated with a repetition rate of 1/T. The non-linearity of frequency sweep during upchirp and downchirp leads to degradation of SNR in the electronic return signals of FMCW lidars. The general process of utilizing a RNDL 100 for navigation 700 in accordance with embodiments of the invention is discussed further below.

Although specific triangular FMCW waves are discussed above with respect to FIG. 6, any of a variety of waves as appropriate to the requirements of a specific application may be utilized in accordance with embodiments of the invention. Processes for navigation using RNDLs in accordance with embodiments of the invention are discussed further below.

Navigation Processes Using RNDLs

RNDLs may be used to perform various processes that support navigation. For example, RNDLs may be used to generate a laser emission where the laser emission generated may have a stable frequency without modulation. Alternatively, the laser emission generated may be an FMCW emission. Further, after or during generating a laser emission, RNDLs may collect an electrical return signal resulting from the laser emission and RNDLs may process the return signal and use it to calculate navigation data. Moreover, based on navigation data (and external requests), RNDLs may determine an operating mode and, in some embodiments, reconfigure the SPCM, the transceivers, or both, to the operating mode.

Figure 7:
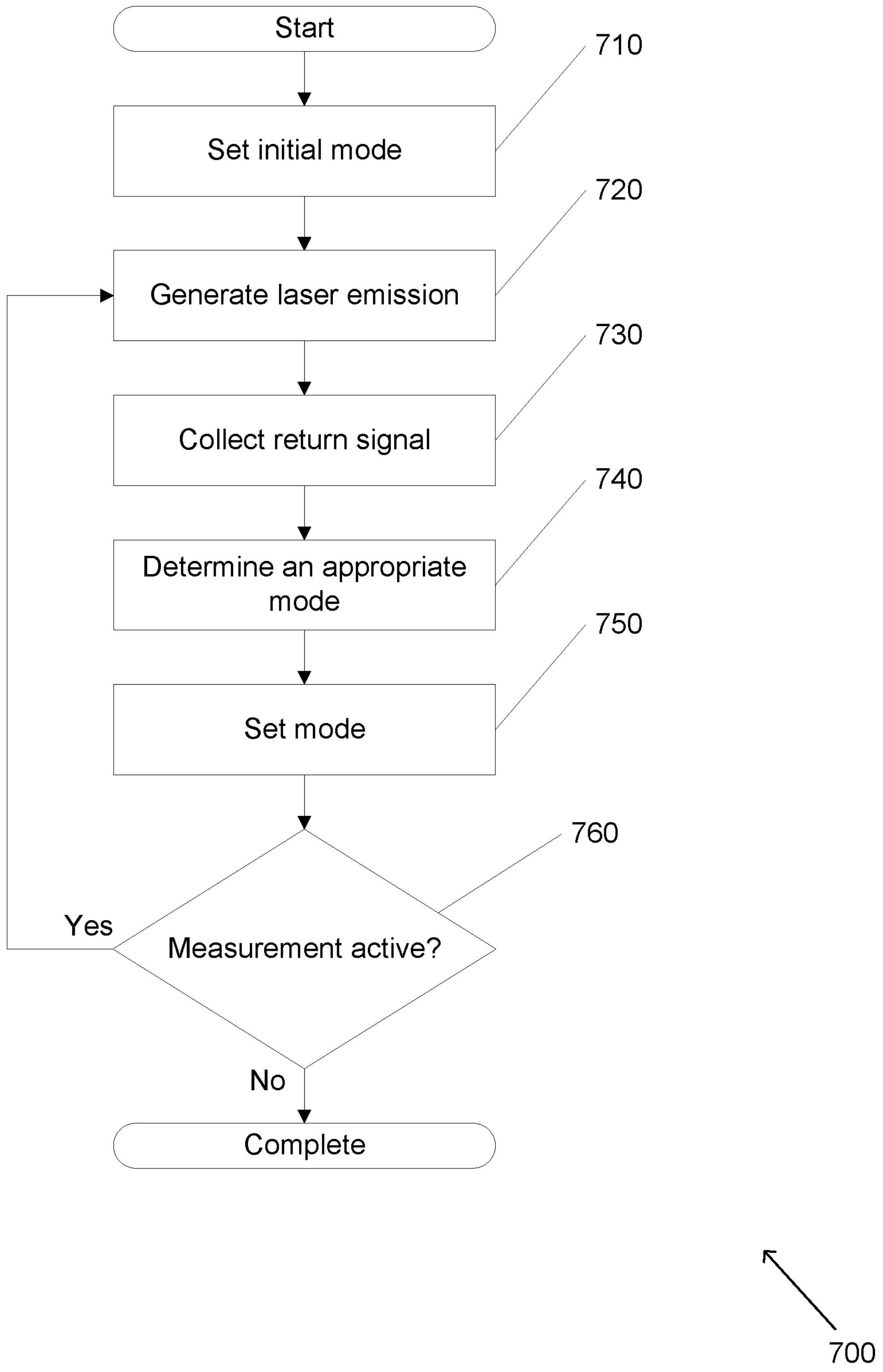
FIG. 7 depicts a flowchart of a process of using a RNDL to set initial mode, generate a laser signal, receive and process a return signal, and determine and set the appropriate operating mode in accordance with an embodiment of the invention.

A flowchart of a process of using a RNDL to set initial mode, generate a laser signal, receive and process a return signal, and determine and set the appropriate operating mode in accordance with an embodiment of the invention is shown in FIG. 7. In many embodiments, when a RNDL first begins operation, the initial operating mode may be set (710). For example, the initial mode may be user-set, automatically set, or preset 710. After determining a current operating mode, the process 700 may also include generating (720) a laser emission. For example, the SPCM may cause the optical module to generate (720) a laser emission that corresponds to the initial operating mode. The process 700 may also include collecting (730) a return signal. For example, the optical module may capture the reflected lidar energy and generate an electrical return signal. The process 700 further include determining (740) an appropriate mode. After the electrical return signal is transmitted to the SPCM, it may be converted to digital form and processed by a DSP. In some embodiments, the SPCM may calculate navigational data, where the navigation data may be determined by the operating mode. For example, when operating in velocity-only mode, it may calculate the relative vector velocity of the device with respect to terrain. Or, for example, when operating in range-plus-velocity mode, it may calculate the relative velocity and range (which may also be referred to as a distance) to targets in each channel, as well as altitude and angles. In several embodiments, when operating in imaging mode, the RNDL may calculate the relative velocity and range of targets in each channel at a higher data rate compared to range-plus-velocity mode. Once the RNDL has completed calculating the desired navigation data, it may determine if a change in operating mode is appropriate.

A change in operating mode may be made by the user, the system, and/or by another method of determination. After determining (740) an appropriate operating mode, the SPCM may compare that to the current operating mode to determine if a change is necessary. If necessary, the SPCM may change and set (750) the operating mode so that the selected operating mode is the appropriate operating mode. If the previously selected mode is the same as the operating mode, the SPCM determines that it is appropriate, then no operating mode change may be necessary. After confirming or switching operating modes, the RNDL may next check to determine (760) if the measurements are still active. If the measurements are not active (760) or requested to be not active, the process is complete. If the measurements are active (760), however, the process may return to the generating (720) laser emission. This may continue until the measurements are no longer requested or the power is turned off.

Figure 8:
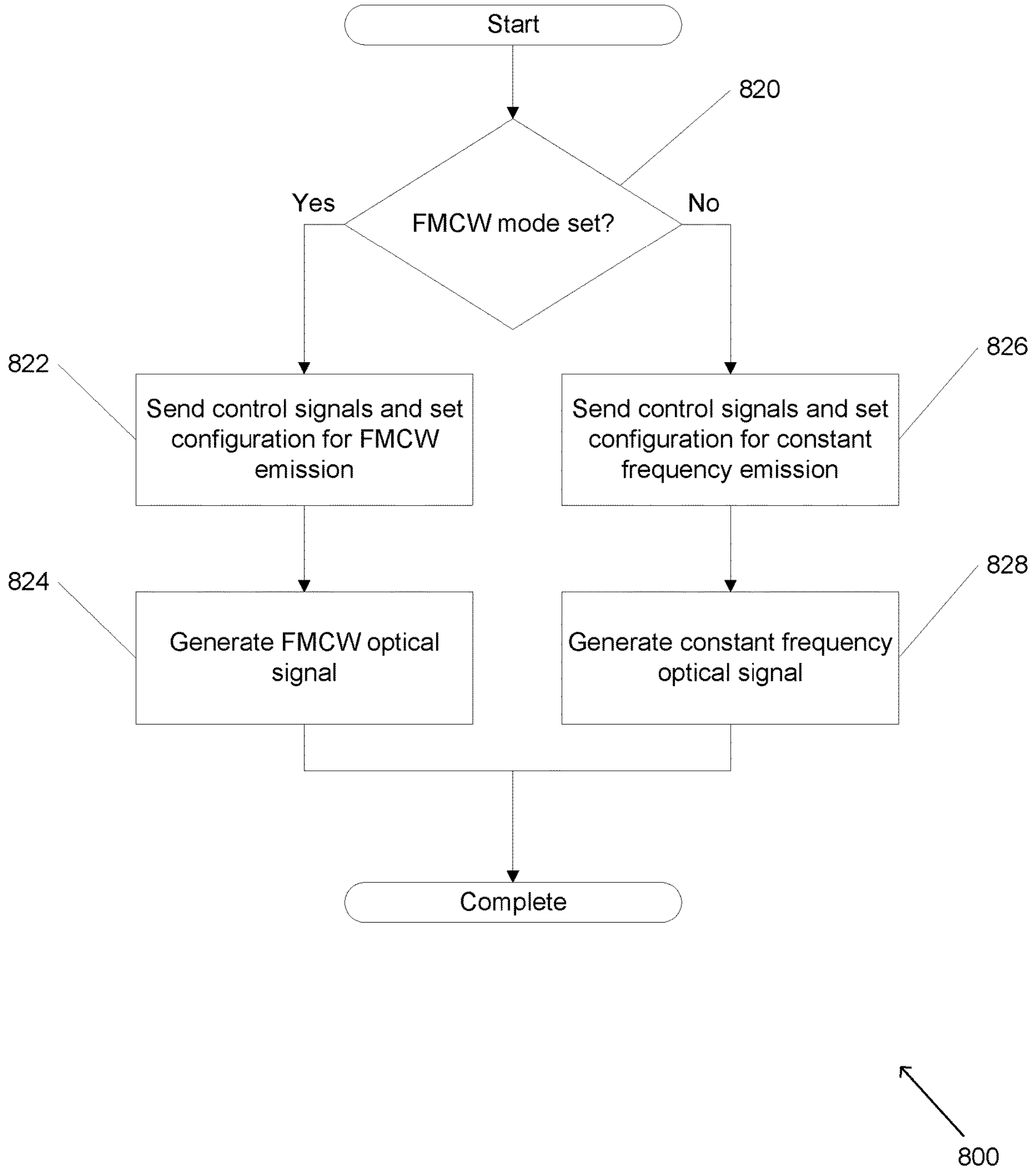
FIG. 8 is a flowchart illustrating a process of generating laser emission with desired frequency modulation type in accordance with an embodiment of the invention.

The optical module may generate FMCW emissions. It may also generate laser emission with nearly constant optical frequency without modulation. At any given time, an optical module may generate the desired type of emission. A flowchart illustrating a process of generating laser emission with desired frequency modulation type in accordance with an embodiment of the invention is shown in FIG. 8. In some embodiments, the process 800 may include determining (820) whether an FMCW mode is set. For example, if the SPCM determines that an FMCW emission is desired (820), it may send (820) a control signal to the optical module or a laser source (e.g., the laser source 212 within the optical module) causing it to generate (824) an FMCW emission 824. In some embodiments, the SPCM and DSP may also be configured to process electric return signals produced, as further described below. Upon receiving a control signal corresponding to an FMCW emission, the laser sources may emit FMCW signals.

In many embodiments, if the SPCM determines (820) that an FMCW mode is not set (e.g., when a constant frequency emission is desired) it may reconfigure itself and the DSP to process electric return signals produced in the non-FMCW mode, as further described below. The process 800 may include sending (826) control signals to optical modules causing generation (828) of frequency emissions at a stable frequency. Once the laser source generates the desired emission, the process 800 may be complete. In many embodiments, the process 800 may be repeated continuously, or for as long as the SPCM sends control signals 822, 826 to the optical modules and laser sources.

In various embodiments, the process 800 may be performed by a single laser source or plurality laser sources. In some embodiments, if a plurality of laser sources is present, a RNDL may operate using one, some, or all the laser sources simultaneously. For example, one laser source 212 may provide laser emission to one or more transceiver channels 260. Further, one or more transceiver channels 320*a* . . . 320*z* may use a dedicated laser source. An RNDL may be configured to utilize a single laser source in accordance with an embodiment of the invention as shown in FIG. 2. For example, an RNDL may include a laser controller 211 configured to control a single laser source 212 to output a single optical output to a splitter tree 220. In this case, each transceiver 260 may share the same laser emission modulation.

The RNDL may also be configured to utilize a plurality of laser sources simultaneously. For example, an RNDL may include a laser controller 211 configured to control a plurality of lasers, each of which may operate independently of the other lasers. In this case, a channel 320 may include the transceiver 260 and its dedicated laser. For example, an RNDL may include a plurality of transceivers 320*a* . . . 320*z* and each transceiver channel may use its own laser modulation format.

Figure 9:
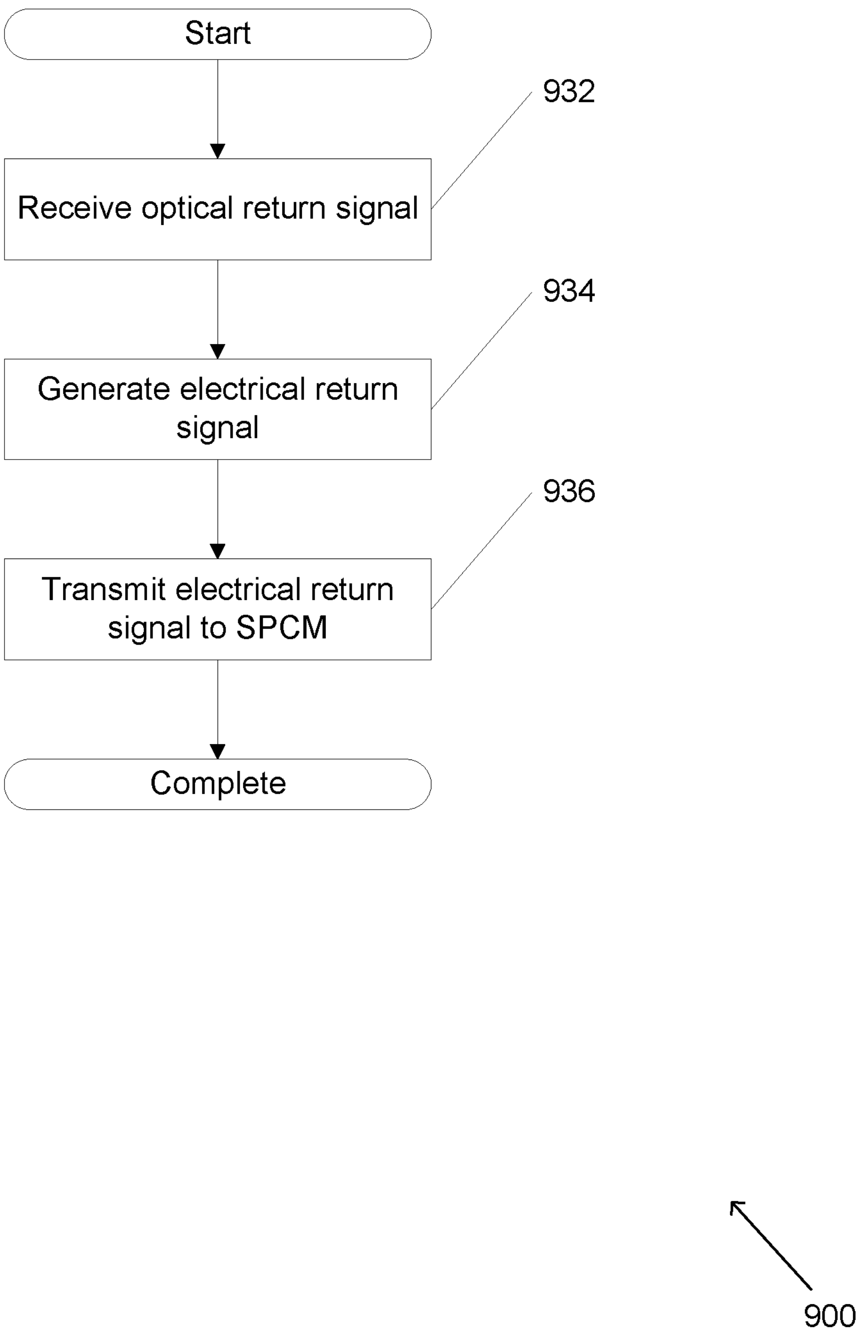
FIG. 9 is a flowchart illustrating a process of receiving and processing the return signals in accordance with an embodiment of the invention.

A RNDL, via an optical module, may receive optical return signals originating from its laser emission. An optical module may then process the return signals to generate electrical return signals. A flowchart illustrating a process of receiving and processing the return signals in accordance with an embodiment of the invention is shown in FIG. 9. The process 900 may include the optical module receiving (932) an optical return signal. As described above, the optical module may receive (932) the return signals via optical IO 232. The process 900 may also include generating (34) an electrical return signal. For example, the mixers in the transceivers may convert and generate (934) the optical signals into electrical return signals. The converted electrical signals (i.e., electrical return signals) may be transmitted (936) to the SPCM. Once the electrical return signal is sent to the SPCM, the process 900 may be complete. This process may continue indefinitely, however, as long as return signal continues to be received by the optical module. As long as the optical module provides these electrical signals to the SPCM, a process of mode determination may occur.

Figure 10:
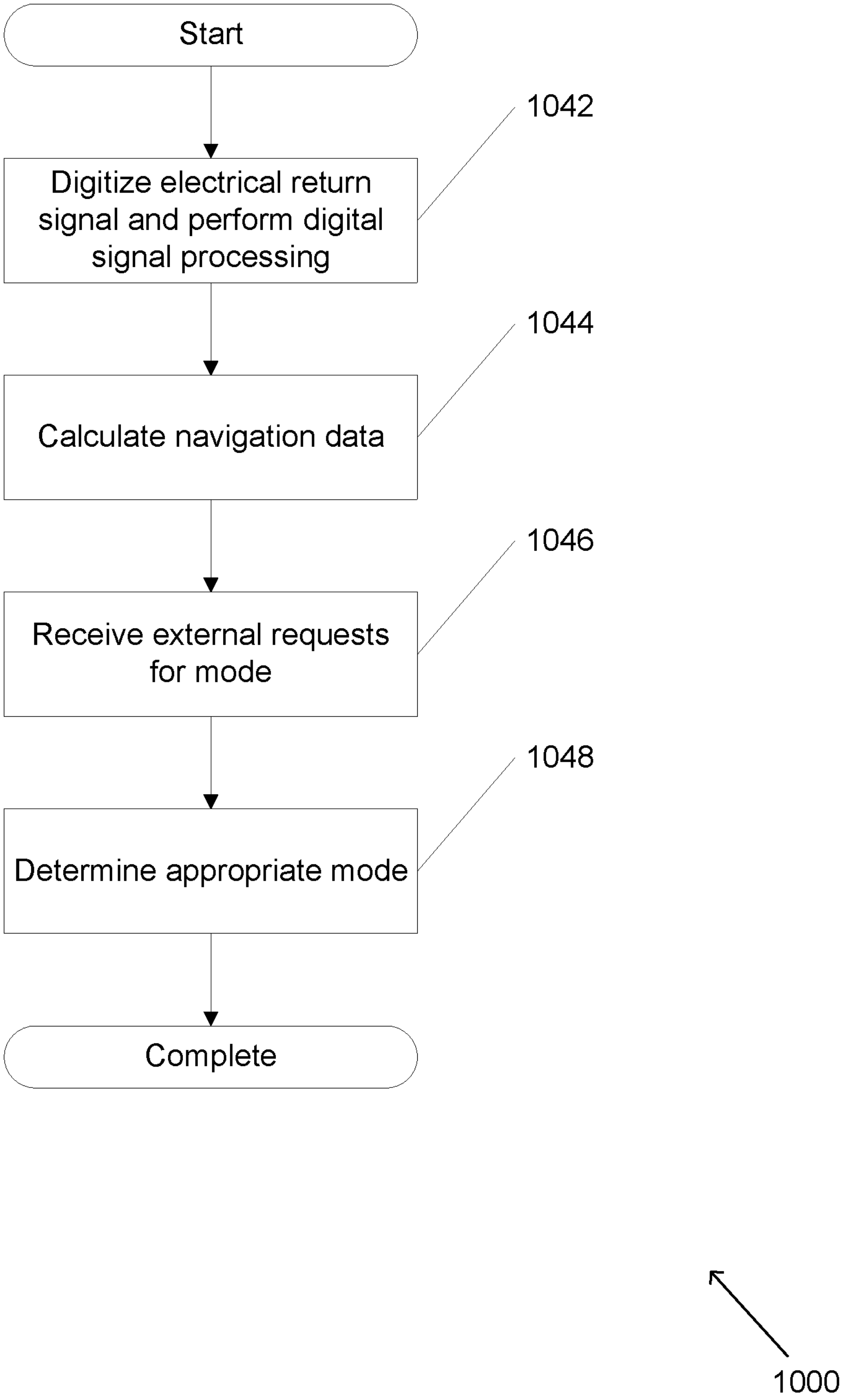
FIG. 10 is a flowchart illustrating a process of determining appropriate operating mode from calculated data and from mode requests in accordance with an embodiment of the invention.

Return signals may contain information that is relevant to determining which operating mode is appropriate. By exploiting the data in the return signal via the DSP and taking into account any external mode requests, the SPCM may determine which operating mode to select. A flowchart illustrating a process of determining appropriate operating mode from calculated data and from mode requests in accordance with an embodiment of the invention is shown in FIG. 10. The process 1000 may include digitizing (1042) electrical return signals and performing digital signal process. As described above, a SPCM may be configured to receive electrical inputs from an optical module. These electrical inputs are produced when the optical module converts an optical return signal into an electrical signal. The optical return signals being converted are the reflected wave energy resulting from the generated laser beam scattering or reflecting from objects. The process 1000 may also include calculating (1044) navigation data. For example, electrical inputs sent to the SPCM from the optical module may be used to calculate (1044) navigation data after such inputs are converted to digital form and processed by the DSP. As discussed above, navigation data calculated from electrical return signals may include range and velocity of terrain or other objects, as well as a form of reflectivity measure characterizing the object surface. By capturing lidar data in at least three different directions, a RNDL may calculate (1044) navigation data such as, but not limited to, a velocity vector.

In reference to FIG. 10, the process 1000 may also include receiving (1046) external requests for mode (e.g., an external user input). Based on the navigation data (or external user input), the SPCM may determine (1048) what adjustments should be made to the laser control signals and which operating mode is desired. For example, based on calculated navigation data and/or external mode requests, the DSP may determine (1048) that velocity-only mode is appropriate. Or alternatively, the DSP may determine (1048) that range-plus-velocity mode is appropriate.

Figure 11:
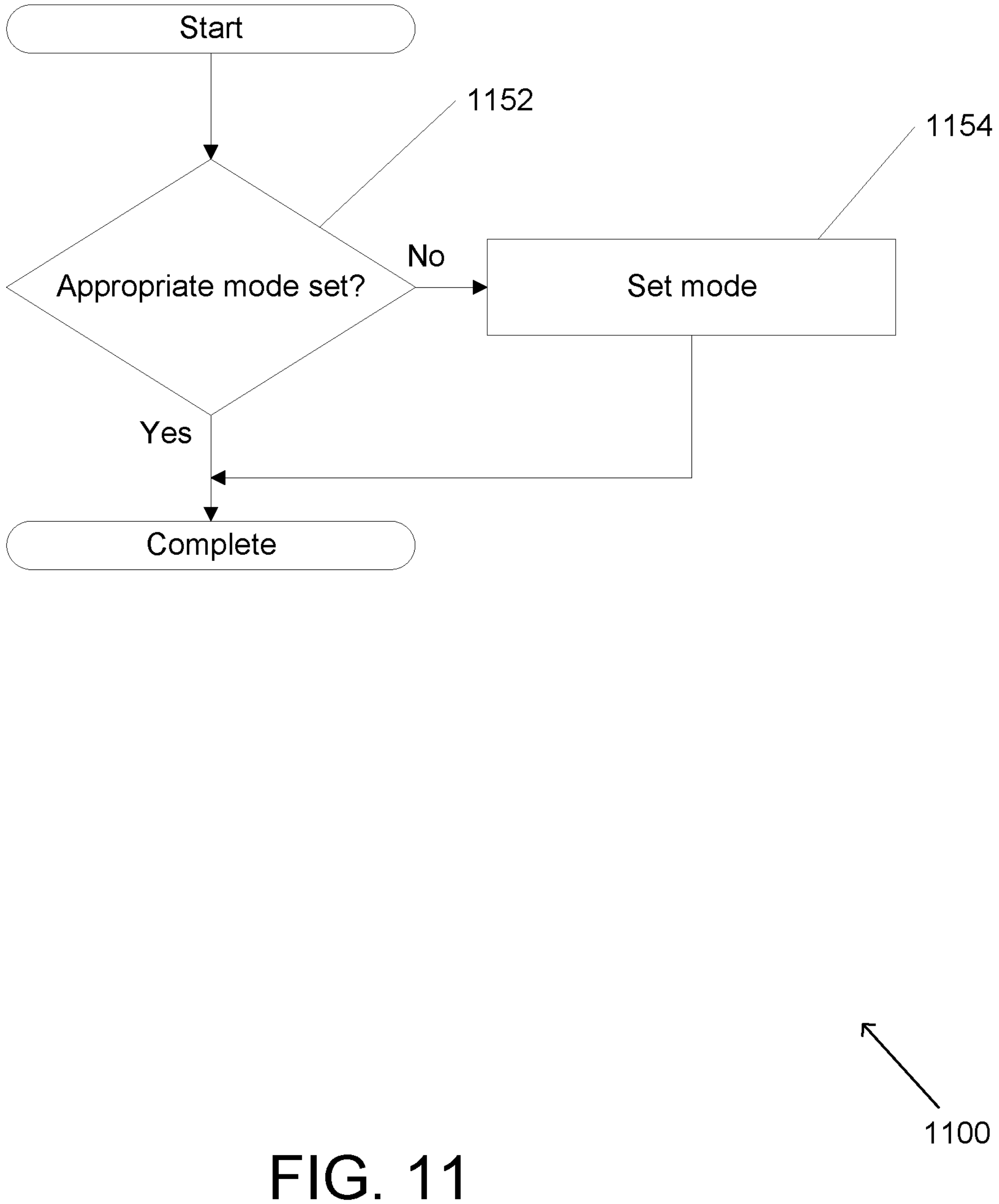
FIG. 11 is a flowchart illustrating a process of reconfiguring a SPCM to operate in the appropriate operating mode in accordance with an embodiment of the invention.

Whichever mode is determined to be appropriate can then enable the next process, mode reconfiguration 1100. A flowchart illustrating a process of reconfiguring a SPCM to operate in the appropriate operating mode in accordance with an embodiment of the invention is shown in FIG. 11. To determine if the operating mode must be reconfigured, the SPCM may first determine (1152) if the appropriate operating mode determined by the DSP is already selected. If the appropriate mode is already selected (1152), there may be no need to reconfigure operating modes and the process 1100 may complete. For example, if the SPCM is operating in velocity-only mode and it determines that the appropriate mode is velocity-only mode, then there is no need to reconfigure the operating mode. On the other hand, however, if the SPCM determines that the appropriate mode is not selected (1152), it may then select and set (1154) the appropriate mode. For example, if the SPCM determines that velocity-only mode is appropriate, but the SPCM is operating in range-plus-velocity mode, then it may change modes by setting the SPCM to velocity-only mode.

Although specific processes for navigation using RNDLs are discussed above with respect to FIGS. 7-11, any of a variety of processes as appropriate to the requirements of a specific application may be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A Reconfigurable Navigation Doppler Lidar (RNDL) for measuring velocity and position relative to terrain, the RNDL comprising:

an optical module comprising:

at least one laser source configured to generate a laser emission, wherein the at least one laser source is capable of operating in a plurality of operating modes; and a transceiver configured to generate at least one electrical return signal; and a signal processing and control module configured to receive the at least one electrical return signal, generate a control signal, and transmit the control signal to the at least one laser source, wherein the control signal causes the at least one laser source to switch between the plurality of operating modes; and wherein the plurality of operating modes includes an imaging mode, wherein the imaging mode uses a Frequency-Modulated Continuous Wave (FMCW) laser emission and wherein ranging and velocity data are produced at an increased rate compared to a range-plus-velocity mode.

2. The RNDL of claim 1, wherein the plurality of operating modes includes a velocity mode, wherein the velocity mode uses a stable laser emission frequency.

3. The RNDL of claim 1, wherein the plurality of operating modes includes the range-plus-velocity mode, wherein the range-plus-velocity mode uses the FMCW laser emission.

4. The RNDL of claim 1, further comprising a plurality of transceivers.

5. The RNDL of claim 4, wherein each of the plurality of transceivers operates independently.

6. The RNDL of claim 5, wherein the signal processing and control module is further configured to process a radial velocity from at least two transceivers to calculate a vector velocity.

7. The RNDL of claim 6, wherein optical power emitted by the at least one laser source can be arbitrarily distributed among the at least two transceivers.

8. The RNDL of claim 4, wherein each of the plurality of transceivers further comprises a dedicated laser source with a selectable operating mode.

9. The RNDL of claim 1, wherein the transceiver is further configured to:

convert a portion of the laser emission into at least one sensing optical signal and a local oscillator optical signal;

receive an optical return signal, wherein the optical return signal includes a portion of the at least one sensing optical signal that was scattered by a target; and generate the at least one electrical return signal by mixing the optical return signal and the local oscillator optical signal using a detector.

10. The RNDL of claim 9, wherein the signal processing and control module is further configured to process the at least one electrical return signal to calculate a radial velocity.

11. The RNDL of claim 9, wherein the signal processing and control module is further configured to process the at least one electrical return signal to calculate a range.

12. The RNDL of claim 9, further comprising at least one optical element to collimate the at least one sensing optical signal.

13. The RNDL of claim 12, wherein the at least one optical element changes a direction associated with the at least one sensing optical signal.

14. The RNDL of claim 13, wherein the signal processing and control module is further configured to determine a Doppler velocity sign.

15. The RNDL of claim 9, wherein the at least one electrical return signal generated by the transceiver includes in-phase (I) and quadrature (Q) signals.

16. The RNDL of claim 1, further comprising an inertial measurement unit (IMU) configured to detect the RNDL's acceleration.

17. The RNDL of claim 16, wherein the IMU is further configured to detect the RNDL's rotation.

18. The RNDL of claim 1, further comprising a digital camera configured to record image data.

19. The RNDL of claim 1, further comprising a global navigation satellite system (GNSS) receiver.

* * * * *